Patented Sept. 5, 1922.

1,427,831

UNITED STATES PATENT OFFICE.

WILLIAM A. McCOOL, OF BEAVER FALLS, PENNSYLVANIA.

METHOD OF MAKING BRICKS.

Application filed November 12, 1919. Serial No. 337,568.

*To all whom it may concern:*

Be it known that I, WILLIAM A. McCOOL, a citizen of the United States, residing at Beaver Falls, in the county of Beaver and State of Pennsylvania, have invented or discovered certain new and useful Improvements in Methods of Making Bricks, of which the following is a specification, reference being had therein to the accompanying drawings.

This invention relates to the manufacture of bricks, paving blocks, and the like, and especially, although not exclusively, to the manufacture of paving bricks of the general character described in Letters Patent Nos. 1,220,292 and 1,220,293, granted to Joseph Wade Tucker and myself March 27, 1917.

Bricks and other articles of this type, comprising an organic or woody aggregate in finely divided form impregnated and united into a solid mass by a bituminous binder, have been found in practice to give excellent results as a paving material and for other purposes, but their use has heretofore been restricted by practical difficulties which have been encountered in manufacturing the same in commercial quantities. These difficulties are incidental to the characteristics of the material of which they are composed. This material, when cold, is extremely hard and rigid, making it practically impossible to cut, mold, or otherwise work the same by any known means or method. When hot, the material is viscous and sticky, offers insufficient resistance to be satisfactorily worked by die machines of modern type, clogs and fouls the machine, and, even if formed into bricks by the use of such a machine, cannot be handled until cold and is too unstable to retain its form in the meantime. As a result, it has, so far as I am aware, been heretofore customary to make articles of this character by forming the hot material into bricks or the like in a molding press, in the molds of which said bricks are allowed to remain until cold in order to retain their shape. This method is slow and expensive in proportion to the output, so that the cheapness and other advantages of the material are more than offset by the cost of manufacture.

The present invention has for its general object to provide an improved method whereby bricks of the character referred to may be cheaply and rapidly produced in quantities. The more particular objects of the invention will best be understood from the following description of one mode of carrying the same into effect, reference being had to the accompanying drawings which show a form of machine or apparatus suitable for the practice of the invention. It will be understood, however, that the particular operation described and the particular apparatus shown have been chosen for illustrative purposes merely, and that the invention, as defined by the claims hereunto appended, may be otherwise practiced without departing from the spirit and scope thereof.

As the result of extensive experiments I have discovered that the bituminous brick material under consideration has a certain critical temperature (varying from 185°, F., to 200°, F., in accordance with variations in the particular ingredients and their proportions in the mixture) at which it is sufficiently plastic to be worked but is at the same time sufficiently stiff to set up the resistance required in order to generate the pressure necessary for die working, and is substantially without viscosity or stickiness. The range of this critical temperature is, however, for any particular mixture, extremely limited, the material, when cooling, normally passing almost imperceptibly from its semi-liquid to its solid state, making it practically impossible to retain the same at this delicate critical point (which, as above stated, varies in different mixtures) by any known method of which I am aware. In accordance with the present invention, however, this critical temperature is taken advantage of in the following manner.

Although other well known bituminous mixtures may, if desired, be employed, the material is, as more fully described in the prior patents above referred to, preferably prepared by separating from each other the relatively light and heavy asphaltums constituting the residue of a mineral oil having an asphalt base, and from which oil the most volatile components have previously been extracted, soaking comminuted cypress wood in said lighter asphaltums to impregnate the same therewith, and thoroughly mixing the impregnated comminuted wood with said heavier asphaltums, it being understood that these operations are performed while the asphaltums are quite hot. The mixture is then allowed to cool and solidify, being broken up, either during or after cooling, into sufficiently small pieces to permit of convenient handling. The material so prepared may, if desired, be stored indefinitely until it is desired to use the same, whereupon it is reheated to the critical temperature necessary to render the same sufficiently plastic to work (which temperature may readily be determined by trial) and simultaneously shaped into bricks or other forms, preferably by the use of a die-working machine.

A machine suitable for this purpose is shown in the accompanying drawings but is not claimed herein, being covered by the claims of a separate application filed November 12, 1919, Serial No. 337,569. Said machine, as to its general organization, is of the well-known Chambers type familiar to those skilled in the brick making art but modified as to certain particulars in order to render the same capable of operation in accordance with the present method.

Figure 1:
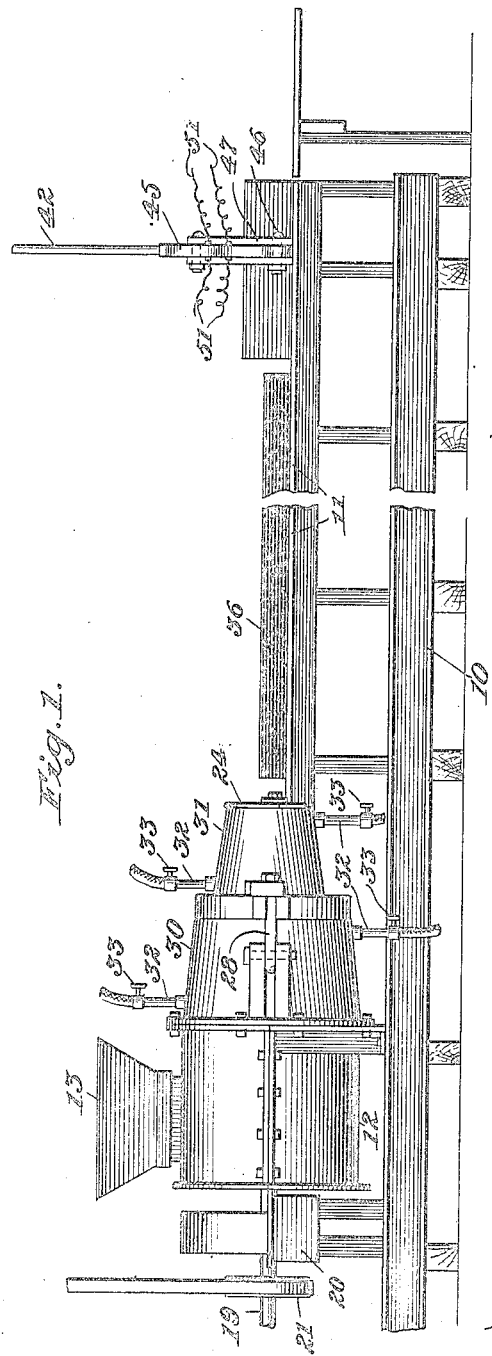
Fig. 1 is a side elevation of the complete machine.
Figure 2:
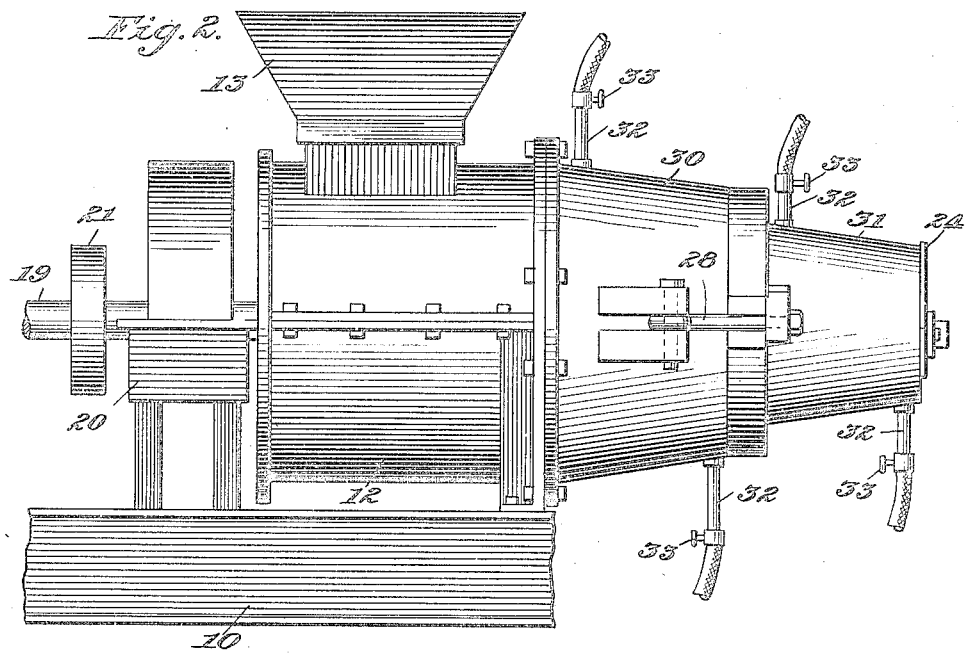
Fig. 2 is an enlarged side elevation of the hopper, feed chamber, and die.
Figure 3:
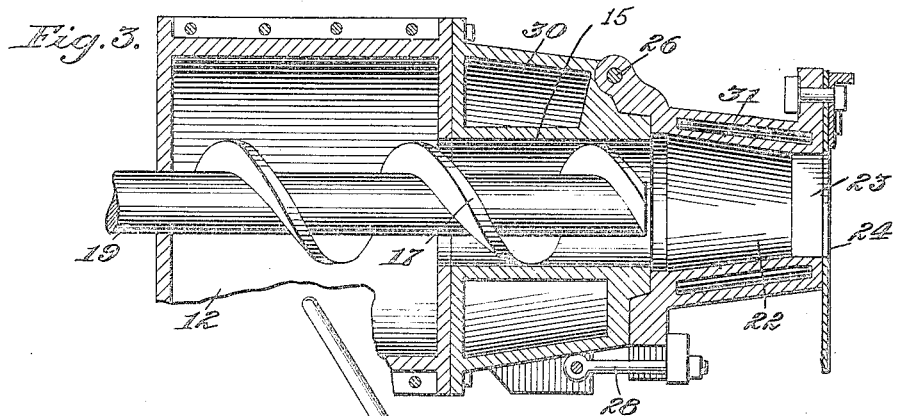
Fig. 3 is a fragmentary horizontal section of certain of the parts shown in Fig. 2.

As shown, the machine comprises an elongated frame 10 carrying at its top a bed or table 11 at one end of which is mounted a horizontally disposed, substantially cylindrical casing 12 with which communicates a hopper 13. Communicating with the forward side of the casing 12 is a coaxially disposed cylindrical feed chamber 15 (Fig. 3) in which is rotatably mounted a worm or feed screw 17 having its rear end extended into the casing 12 and vertically beneath the hopper 13. The feed screw 17 is mounted on a shaft 19 journalled in one or more suitably disposed bearings 20 and carrying a belt pulley 21 whereby power may be applied thereto to rotate the same. Communicating with the forward end of the feed chamber 15, and extending beyond the forward end of the feed screw, is a coaxially disposed outwardly tapering expressing die 22 having an extrusion orifice 23 corresponding in shape to one section of the brick or block to be made, and adjacent which is arranged a preferably pivoted cut-off knife 24 (Figs. 1 and 2). The die 22 is preferably hinged, as at 26 (Fig. 3), to the forward end of the wall of the feed chamber, to permit said die to be swung to one side for purposes of cleaning, repair, or otherwise, and is normally retained in operative position, as shown, by means of a swing bolt 28. Means are provided for heating the feed chamber 15 and die 22 to a constant temperature corresponding to the critical temperature of the material being worked, said means as herein shown comprising jackets 30 and 31 surrounding said chamber and die respectively, said jackets being supplied with steam or other heating fluid by suitably arranged pipes 32 controlled by valves 33. The piping leading to the jacket 31 of the die 22 preferably comprises a flexible hose or a series of swivelled sections in order to permit the ready turning of said die upon its hinge 26.

In the practice of the present invention by means of an apparatus of the character described, the fragments of relatively cold material are supplied to the hopper 13 from the bottom of which they are fed forwardly by the screw 17 through the feed chamber 15 to the die 22, heating fluid being admitted through the pipes 32 to the jackets 30 and 31 to heat the material during its passage through the feed chamber and die. As above pointed out the material, when cold, is altogether too hard and unyielding to pass through the die and to be molded thereby, but, by proper manipulation of the valves 33, the heat may be applied and gradually increased until the material begins to come through the die at the proper consistency. In this manner the critical working temperature of a given quantity of material may be readily determined and applied, and may be maintained by a proper setting of the valves 33, which may, however, be adjusted slightly from time to time as the apparatus becomes heated, or to compensate for variations in the mixture, it being understood that the material is at no time permitted to become sufficiently hot to render the same objectionably viscous or sticky.

The material, after leaving the die, passes to the bed or table 11 in the form of an elongated bar (Fig. 1) which is divided by the knife 24 into convenient lengths (preferably about 15 feet each), the latter being subsequently cut up into individual bricks. After leaving the die, the material, of course, immediately cools below the critical temperature and therefore becomes hard and unworkable. In order, therefore, to permit the separation of the bar 36, or the lengths thereof, into bricks, there is, in accordance with the present invention, employed a heated knife, which, by locally heating the material along the cutting planes, permits the same to be readily severed into sections of the desired size without material softening, and consequent distortion thereof between said planes. As herein shown, and as claimed in my co-pending application above referred to, a suitable construction is as follows.

Figure 4:
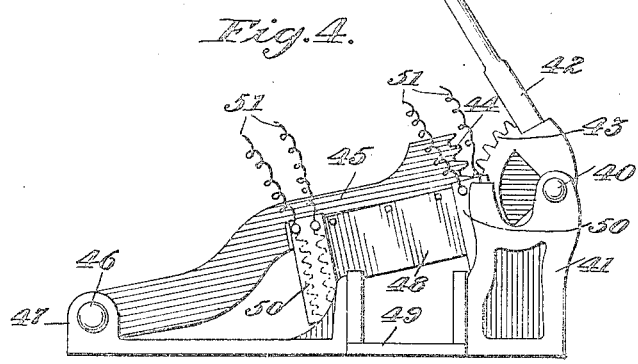
Fig. 4 is a detail elevation of the heated knife for severing the individual bricks from the strip or bar produced by the die.

Pivoted at 40 (Fig. 4) to a bracket or upright 41 disposed at one side of the table 11 adjacent the end thereof opposite the casing 12 (Fig. 1), is an operating lever 42 having a gear segment 43 which meshes with a gear segment 44 on the end of a cutting lever 45 pivoted at 46 to a bracket 47 at the opposite side of the table. Bolted or otherwise secured to the cutting lever 45 is a blade 48 which operates in a transverse slot in a longitudinal rectangular guide 49 and is provided at its ends outside said guide with electric heaters 50 of any suitable or well known type supplied with current from any suitable source by wires 51. The heaters 50 are adapted to heat the blade 48 to a temperature slightly above the critical temperature of the material, so that, as the bar 36 is moved progressively forwardly in the guide 49, said blade may, by the operation of the lever 42, be depressed and simultaneously cut and melt its way through the bar, thereby separating the latter into bricks.

The bricks so formed may, if desired, be finished in a press to consolidate the same and to form them to accurate dimensions with sharp edges and corners, although for many purposes such final press finishing is unnecessary.

The terms "bricks" and "blocks" as herein used are to be taken as broad and general in their meaning and to include paving or structural elements of any form or size suitable for the uses to which they are to be put and capable of being manufactured in accordance with the method above described and defined by the following claims.

Although, as hereinbefore stated, the wood and bituminous mixture, from which the bricks or blocks, etc. are made, may be prepared by soaking comminuted cypress or other non-resinous wood in a relatively light heated asphaltum and then mixing the impregnated comminuted wood with a heavier heated asphaltum, it has been found in practice that the use of the lighter asphaltum may be omitted and good results still be obtained.

The term "non-resinous wood" as herein used will be understood to refer to wood which is naturally non-resinous, as cypress wood, or to resinous woods which have been so treated that the resin has been extracted, so that they are therefore no longer resinous.

Having thus described my invention I claim and desire to secure by Letters Patent:

1. The herein described method of making bricks, blocks, or the like from initially heated bituminous material, which consists in cooling the material to solidify the same and render it resistant and thereafter reheating the same to its critical temperature and simultaneously shaping it into the desired form.

2. The herein described method of making bricks, blocks, or the like from initially heated bituminous material, which consists in cooling the material to solidify the same and render it resistant and thereafter reheating the same to a sufficient temperature to render it stiffly plastic and simultaneously shaping the same under pressure into the desired form.

3. The herein described method of making bricks, blocks, or the like from bituminous material, which consists in passing the material through a die-working machine in the presence of sufficient heat to render the same stiffly plastic without stickiness.

4. The herein described method of making bricks, blocks, or the like from initially heated bituminous material, which consists in cooling the material to solidify the same and render it resistant, and thereafter passing the same through a die-working machine in the presence of sufficient heat to render it stiffly plastic.

5. The herein described method of making bricks, blocks, or the like, which consists in impregnating a comminuted organic aggregate with a relatively light hydrocarbon material, mixing the same with a relatively heavier hydrocarbon material in the presence of heat, cooling the mixture to solidify the same and render it resistant, and thereafter reheating said mixture to its critical temperature and simultaneously shaping the same into the desired form under heavy pressure to unite it into a solid mass.

6. The herein described method of making bricks, blocks, or the like, which consists in separating from each other the relatively light and heavy asphaltums constituting the residue of a mineral oil having an asphalt base, soaking comminuted cypress wood in said lighter asphaltums to impregnate the same therewith, mixing the impregnated comminuted wood with said heavier asphaltums in the presence of heat, cooling the mixture to solidify the same and render it resistant, and thereafter reheating said mixture to its critical temperature and simultaneously shaping the same into the desired form under heavy pressure to unite it into a solid mass.

7. The herein described method of making bricks, blocks, or the like from bituminous material, which consists in forming the material into an elongated bar at a sufficiently high temperature to permit working thereof, allowing the same to cool and harden, and thereafter severing said bar into individual bricks by means of a heated cutter.

8. The herein described method of making bricks, blocks, or the like from bituminous material, which consists in shaping the material into an elongated bar at a critical temperature sufficient to render the same stiffly plastic without stickiness, and thereafter severing said bar into individual bricks by means of a heated cutter.

9. The herein described method of making bricks, blocks, or the like from initially heated bituminous material, which consists in cooling the material to solidify the same and render it resistant, reheating the same to its critical temperature and simultaneously shaping it into an elongated bar, and thereafter severing said bar into individual bricks by means of a heated cutter.

10. The herein described method of making bricks, blocks, or the like from bituminous material which consists in passing the material through a die-working machine in the presence of sufficient heat to render the same stiffly plastic without stickiness to form it into an elongated bar, and thereafter severing said bar into individual bricks by means of a heated cutter.

11. The herein described method of making bricks, blocks, and the like from initially heated bituminous material, which consists in cooling the material to solidify the same and render it resistant, passing the same through a die-working machine in the presence of sufficient heat to render it stiffly plastic, without excess, to form the same into an elongated bar, and thereafter severing said bar into individual bricks by means of a heated cutter.

12. The herein described method of making bricks, blocks, and the like, which consists in separating from each other the relatively light and heavy asphaltums constituting the residue of a mineral oil having an asphalt base, soaking comminuted cypress wood in said lighter asphaltums to impregnate the same therewith, mixing the impregnated comminuted wood with said heavier asphaltums in the presence of heat, cooling the mixture to solidify the same and render it resistant, passing the same through a die-working machine in the presence of sufficient heat to render it stiffly plastic, without excess, to form the same into an elongated bar, and thereafter severing said bar into individual bricks by means of a heated cutter.

In testimony whereof I affix my signature.

WILLIAM A. McCOOL.